(12) United States Patent
Puppin

(10) Patent No.: US 9,809,011 B1
(45) Date of Patent: Nov. 7, 2017

(54) COMPOSITE FABRIC MEMBER AND METHODS

(71) Applicant: Giuseppe Puppin, Stillwater, MN (US)

(72) Inventor: Giuseppe Puppin, Stillwater, MN (US)

( * ) Notice: Subject to any disclaimer, the term of this patent is extended or adjusted under 35 U.S.C. 154(b) by 0 days.

(21) Appl. No.: 14/735,995

(22) Filed: Jun. 10, 2015

Related U.S. Application Data

(60) Provisional application No. 62/010,725, filed on Jun. 11, 2014.

(51) Int. Cl.
| | | |
|---|---|---|
| *E06B 7/16* | (2006.01) | |
| *E06B 7/22* | (2006.01) | |
| *D04H 11/00* | (2006.01) | |
| *B32B 27/12* | (2006.01) | |
| *B32B 5/02* | (2006.01) | |

(52) U.S. Cl.
CPC ............... *B32B 27/12* (2013.01); *B32B 5/02* (2013.01); *B32B 2307/736* (2013.01); *B32B 2419/00* (2013.01); *B32B 2605/006* (2013.01)

(58) Field of Classification Search
CPC ... D05C 17/02; E06B 7/16; E06B 7/22; E06B 7/205; E06B 7/2303; D04H 11/00; B29C 47/02; B29C 47/021; B29C 47/0808
USPC ........... 49/475.1, 479.1, 483.1, 498.1, 490.1; 428/36.1, 36.9, 188, 36.91, 36.3, 92, 95, 428/96
See application file for complete search history.

(56) References Cited

U.S. PATENT DOCUMENTS

| | | | |
|---|---|---|---|
| 1,960,997 A | 5/1934 | Halloran | |
| 2,012,625 A | 8/1935 | Calcutt | |
| 2,556,885 A | 6/1951 | Bernard | |
| 2,724,877 A | 11/1955 | Ramsay | |
| 3,155,540 A | 11/1964 | Loeffler et al. | |
| 3,245,864 A | 4/1966 | Abraham et al. | |
| 3,836,421 A | 9/1974 | Shirer et al. | |
| 3,849,174 A | 11/1974 | Ancker | |
| 4,603,074 A | 7/1986 | Pate et al. | |
| 4,762,751 A | 8/1988 | Girgis et al. | |
| 5,061,572 A | 10/1991 | Hamada et al. | |
| 5,225,457 A | 7/1993 | Borowczak et al. | |
| 5,393,599 A | 2/1995 | Quantrille et al. | |
| 5,997,989 A | 12/1999 | Gessner et al. | |
| 6,180,243 B1 | 1/2001 | Johnson et al. | |

(Continued)

FOREIGN PATENT DOCUMENTS

| | | |
|---|---|---|
| CA | 768526 A | 10/1967 |
| EP | 0475728 A2 | 3/1992 |
| GB | 1264881 A | 2/1972 |

OTHER PUBLICATIONS

Wallenberger Fredrick T. et al., "Glass Fibers", ASM International, 2001, vol. 21: Composites(#06781G).

*Primary Examiner* — Camie Thompson
(74) *Attorney, Agent, or Firm* — Mark J. DiPietro; Fred C. Morgan

(57) ABSTRACT

A planar article in the form of a thin strip is shown. The article, comprising a fabric and a polymer, can be formed into a variety of shapes. A hollow profile made from the article by forming a seam using opposing edges of the strip to enclose a volume. A thermoplastic extrusion formed composite structural member and method for making is disclosed. In one embodiment, the composite structural member includes a first web made from a first material and a first resin, a second web made from a second material different from the first material, a third web made from a third material and a third resin, and a fourth web made from a fourth material.

5 Claims, 15 Drawing Sheets

(56) References Cited

U.S. PATENT DOCUMENTS

| | | |
|---|---|---|
| 6,235,658 B1 | 5/2001 | Panzer et al. |
| 6,410,465 B1 | 6/2002 | Lim et al. |
| 6,441,267 B1 | 8/2002 | Dugan |
| 6,531,010 B2 | 3/2003 | Puppin |
| 6,765,052 B2 | 7/2004 | Shin et al. |
| 6,982,293 B2 | 1/2006 | Shin et al. |
| 7,169,842 B2 | 1/2007 | Beck |
| 7,244,333 B2 | 7/2007 | Hutchison et al. |
| 8,012,293 B2 | 9/2011 | Lee |
| 8,187,423 B1 | 5/2012 | Glenn et al. |
| 8,546,470 B2 | 10/2013 | Joyce et al. |
| 2006/0252320 A1 | 11/2006 | Panse |
| 2008/0166533 A1 | 7/2008 | Jones et al. |
| 2009/0036566 A1 | 2/2009 | Li et al. |
| 2011/0021701 A1 | 1/2011 | Bismarck et al. |
| 2011/0263758 A1 | 10/2011 | Wu et al. |
| 2013/0334725 A1 | 12/2013 | Medoff |
| 2014/0026290 A1 | 1/2014 | Howland |

COMPOSITE FABRIC MEMBER AND METHODS

CLAIM OF PRIORITY

This application claims the benefit of U.S. Provisional Application No. 62/010,725, filed Jun. 11, 2014, the content of which is hereby incorporated herein by reference in its entirety.

FIELD

Disclosed is a composite material comprising a natural fiber yarn in the form of a woven fabric and a polymer. The polymer is substantially coextensive with the fabric and in contact with and at least partially embedding the yarn of the fabric. The composite can contain additional materials or components.

BACKGROUND

When exposed to environmental conditions of ultraviolet light (UV), extreme heat or cold, rapid temperature change, or moisture in the form of humidity, rain, ice and snow, the mechanical stability of useful articles is needed. A substantial need is seen for an article that has mechanical strength and flexibility, moisture resistance, minimal changes when exposed to changes in temperature, UV and can be easily manufactured.

Thermoplastic composite and extrusion formed structural members and related processes are known for use in useful articles such as transportation vehicles or constituent parts of a building envelope. For example, such members have been commonly used in automotive trunk, door and window seals, exterior siding and window and door assemblies. Such assemblies can be used in commercial or residential architecture or in refrigeration/freezer applications, etc. However, some thermoplastic composite structural members are relatively costly to produce, have deficiencies with regard to structural and/or thermal performance, and are generally formed from non-biologically derived materials. Accordingly, improvements are desired.

Systems are known for separating two or more panes of glass in order to construct an insulated glass assembly. Early constructions, for example those detailed in U.S. Pat. Nos. 4,335,166 and 4,909,874, focused on metal spacer elements to provide structural rigidity and compression resistance to the glass edge, while restricting gas transfer through the exterior perimeter of the spacer material. These constructions suffer from poor insulating capability of the spacer system, resulting in undue heat loss through the system and subsequent cold-weather condensation at the edge of the interior glass pane. In addition, these constructions provide insufficient elastic deformation under compressive loads, resulting in high glass stress and breakage in these conditions. Later art was focused on U-shaped, roll-formed metal spacer constructions that provide adequate elastic deformation, under compressive loads. This art is described in U.S. Pat. Nos. 4,530,195; 5,094,055; 5,177,916; 5,255,481; and 5,361,476. While this art results in reduced glass breakage, the heat loss and condensation issues remain. Still later art focused on replacing much of the metal materials in the spacer system with polymeric materials. Such art is taught in U.S. Pat. Nos. 4,113,905; 4,564,540; 5,443,871; 5,485,710; 5,491,953; 5,658,645; 6,311,455; 6,686,002; and 7,270,859. While these display superior insulating properties, many of these materials contain constituents that vaporize with time and collect as a 'fog' on the interior surface on one or more of the panes of the insulated glass. Other systems combine polymeric and metal elements in such a way that the glass periphery is contacted with a hard metal edge. This results in microscopic damage to the glass edge and eventual glass breakage, resulting from this microscopic damage. All of the systems that provide improved insulating capabilities to the spacer by incorporating polymeric constituents as a replacement of metals, result in increased cost due to the higher cost of polymeric materials compared to an equivalent metal component.

Although the art contains many concepts for creating useful assemblies, many configurations fail to provide superior insulating properties, sufficient compression resistance; elastic deformation to prevent stress resistance to microscopic damage in an edge upon handling and exposure; resistance to fogging of the insulated glass.

Systems are also known for residential and commercial construction siding, which is the cladding or outer covering of a structure, meant to protect it from the effects of wind, water and sunlight. The traditional siding material is steel, aluminum, PVC, wood clapboard or beveled siding. Wood members, thin at the top and thick at the bottom, are overlapped in rows or courses. This concept for siding has been used for centuries, but suffers from the problem that the wood members require regular painting or treatment with toxic solutions to prevent fungal decay. They are also prone to attack by insects like carpenter ants or termites.

Metal siding members became popular during the first half of the twentieth century. Steel clapboard siding was patented in 1903 by Sears Roebuck & Company. Later, aluminum became a popular material for this style of siding. The members were designed to be applied as a cladding over the top of existing wood siding in order to avoid the repeated painting and treating processes cited earlier. Metal siding members, however, suffer from problems of corrosion, especially in coastal regions. Metal siding at the material thicknesses commonly used can be dented by hailstorms. In addition, metal siding suffers from the fact that the materials of construction have a finite abundance at the earth's surface and thus, once depleted, are not renewable.

Poly vinyl chloride (PVC) or vinyl siding was introduced in the late 1950's. Its design was essentially a one-for-one replacement to aluminum siding. Because of this, the many adjoining components (outside corner trim, inside corner trim, soffit, etc.) could still be used, enabling easier adoption and scale-up of the product. Today, vinyl is the most commonly used residential exterior cladding in the U.S. Recent siding products made from fiberglass-reinforced cement or fiberglass reinforced polymer have been developed.

BRIEF DISCUSSION

We have found an extruded composite fabric/polymer article and methods for manufacturing the extruded article. The article can be planar or shaped. The article can have reinforcing elements, installation elements or decorative elements. The extruded article comprises an elongated structure comprising a natural fiber fabric formed with an extruded layer of a polymeric or resinous material. The article is substantially non-extensible, has mechanical strength and flexibility, moisture resistance, minimal changes when exposed to changes in temperature including minimal shrinkage or coefficient of thermal expansion, UV resistance and can be easily manufactured.

The article can be used in a planar form in a variety of applications but can also be formed into a hollow member for use in applications where such a structure finds utility. Such a hollow member can be formed by joining the article at the opposite edge portions forming a seam which in turn forms an elongated tubular structure with an internal hollow or void space within the hollow member. The hollow member can be formed (or combined with) with a variety of additional elements at various places in the formed structure. For example, a reinforcing member can be added to the composite for increased resistance to expansion shrinkage or mechanical failure. Alternatively, a film or more rigid sheet like member can be joined at the seam between the edges or adjacent to one or the other edge or both on the exterior of the layer.

In one aspect, the article can be manufactured with a polymer resin in contact with the fabric yarn. In another aspect, a first polymer resin is formed on one surface of the fabric and a second polymer on the opposite surface of the fabric. The first polymer resin and the second resin can be the same or they can be different in some aspect of monomer composition, molecular weight, thickness, or other aspect.

In further aspects, a fabric is coated with polymer, and the polymer is at least partially embedded into fabric, or is fully embedded in a fabric wherein the fabric is entirely encapsulated by the polymer layer.

In still another aspect, the fabric is embedded into a surface of the polymer layer wherein at a minimum, the shape or profile of the yarn weave is seen covered with resin on the surface of the side of the polymer layer. In this aspect, the fabric can be fully adhered to the side of the polymer layer or the depth of the fabric in the layer can be adjusted such that the polymer fills the weave to some degree leaving the profile or the shape of the fabric weave apparent but fully embedded.

In one final aspect, the fabric is embedded in the polymer layer such that the outside edge of the fabric and the outside edge of the polymer layer are coextensive.

In an embodiment, the article and hollow member can have at least one reinforcing member places linearly along the fabric. The article is free of any natural rubber that can be foamed or un-foamed. In an embodiment, the yarn fabric is a natural cellulosic and the yarn is free of synthetic polymer. In one embodiment the article and hollow member are both substantially free of any foamed thermoplastic. In a further embodiment, the article and hollow member are free of fiber fluff. In a still further aspect, the article and hollow member are free of any fabric sizing or other fabric additive or coating. The fabric can be non-shrinking or shrink resistant through prewashing (at elevated temperature in the presence of detergents) or conventional fabric compaction.

Shrink resistant fabric can be made by compressive treatment of knitted fabrics. Such treatment is a simple process whereby the lengthwise stitches of the fabric are mechanically compacted to increase stability. In a typical setup, the untreated knitted fabric supported by the plasma coated main roll, is introduced into a converging passage, firmly gripped and conveyed into a treatment cavity, where the compaction takes place. Underneath the tungsten-carbide coated retarder are photo-etched micro-grooves which hold back the fabric and process it with hundreds of individual treatment zones. The force thus delivered provides high levels of compaction. The Walton curve with its spring-like action combined with the individual treatment zones at the retarder assures a compacting effect, which is characteristic of the technology, resulting in uniform and even compaction.

A thermoplastic composite or extrusion formed composite structural member and method for making is disclosed. The composite structural member may be formed in a variety of shapes (i.e.) as a weather-strip, an auto seal, refrigeration/freezer seal, as a barrier for a double pane window, such as a spacer, or may be formed as exterior siding, or other types of components, as explained further herein. In one embodiment, the composite structural member is formed as a hollow member. In another embodiment the member includes at least a first web made from a first material and a first resin, and at least a second web made from a second material different from the first material. In one aspect, the first web is wrapped around and joined to a portion of the second web. In another aspect, the first material is a biodegradable material, such as a plant based material. The thermoplastic formed composite structural member may also include a third web made from a third material and a third resin, and a fourth web made from a fourth material. In such a configuration, the first web can be wrapped around and joined to a portion of the fourth web while the third web can be wrapped around and joined to a portion of the second web and a portion of the fourth web.

In one aspect, the member and its constituent parts have superior insulating properties, improved compression resistance sufficient to resist wind loads without sustaining damage, adequate elastic deformation under compression loading to prevent stress, and superior communication with the interior air space, resistance to gas permeability through its perimeter surfaces. In one embodiment, the glass spacer prevents direct contact of a metal edge with the glass periphery, is resistant to glass fogging, and is produced from low-cost materials such as a biologically-derived fabric.

In one embodiment, the above characteristics are all satisfied by providing an extruded article of a fabric and a thermoplastic, a hollow member made from the article or a member including further elements such as: a reinforcing glass member, a thin metallic strip having two opposing surfaces and two opposing edges, one surface defining the exterior perimeter of the spacer and the opposing surface defining a surface of the interior cavity of the spacer; a second material composed of a low-cost fabric, permeable to water vapor and intimately coated with a cured thermoset resin; wherein the second material encases the strip edges and forms two legs, effectively parallel to each other and perpendicular to the strip surfaces; a third leg, parallel to the strip surfaces and at a distance from the strip surfaces defined by the first two legs; wherein the third leg is composed of a low-cost fabric, intimately coated with a cured thermoset resin except for a narrow strip down the center of the surfaces it defines.

DEFINITIONS

The term "fabric" as used in this disclosure refers to a woven or non-woven sheet material. A shrink resistant fabric can be used where dimensional stability is needed. The term "shrink resistant" as used means a fabric processed to have minimal longitudinal shrinkage of less than 0.5% or less than 0.2%. The term "yarn" as used in this disclosure refers to a continuous often plied strand composed of either natural fibers or filaments and used in weaving and knitting to form either the warp (yarn fiber in the loom machine direction) or fill (weft) (yarn fiber in the cross machine) portion of a woven fabric. The term "fiber" or "filament" as used refers to the material that is formed into the yarn and is generally obtained from natural sources in lengths generally shorter than the yarn.

For the purpose of this disclosure, the term indeterminate length indicates that the length of the fabric is optional and arbitrary to the user. Typically the length is greater than one meter, often greater than 10 meters and is often 20-500 meters. Such a length provides for the ease of manufacture of the extruded material and the ease of reel to reel storage and use of the material when used. Such lengths can be made from stock fabric on rolls or bolts by slitting widths to useful dimensions.

Yarn count is based on a count in either the warp or weft (fill) and not a combined count of both warp and weft.

The transitional phrase "consisting essentially of" limits the scope of a claim to the specified materials or steps "and those that do not materially affect the basic and novel characteristic(s)" of the claimed invention. In this disclosure, the structure is made with fabric polymer and optional reinforcement. The structure is intended to incorporate elements or structural embodiments made of the fabric, polymer and reinforcements but are not intended to comprise additional structure or components.

BRIEF DESCRIPTION OF THE FIGURES

Non-limiting and non-exhaustive embodiments are described with reference to the following figures, which are not necessarily drawn to scale, wherein like reference numerals refer to like parts throughout the various views unless otherwise specified.

In FIG. 7 the entire fabric is embedded in the resin except for a portion of the fill fiber 9.

DETAILED DESCRIPTION

Figure 1:
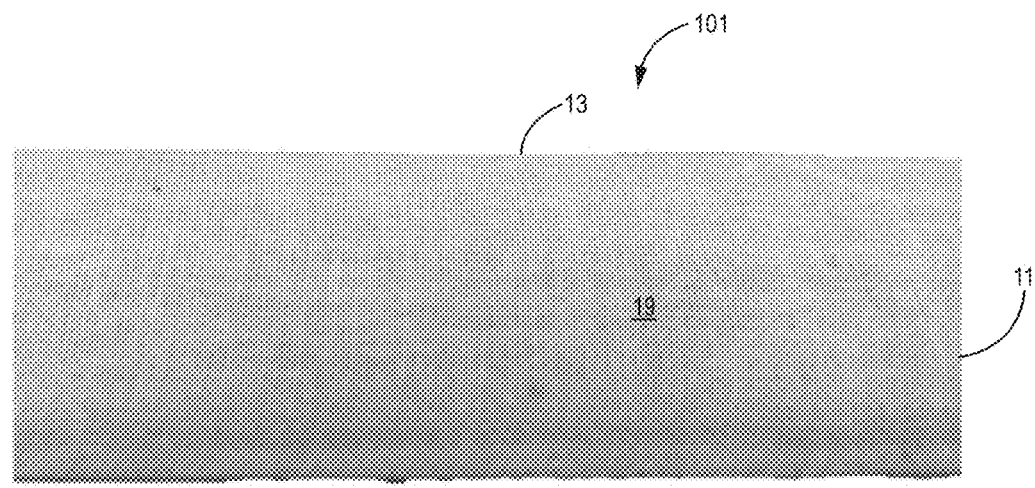
FIG. 1 is an isometric view of an embodiment of the planar flexible polymer fabric composite.

The extruded article comprises a fabric layer having an indeterminate length. The article comprises a thermoplastic layer extruded or co-extruded and in contact with the yarn of the fabric layer. The article can contain one or more reinforcing members in the form of a glass fiber, yarn, fabric or tape. The fabric layer typically is a woven natural or a cellulosic material having a thread or yarn count of a useful fabric can range from 500 threads or yarns per inch to 15 threads or yarns per inch (197-6 per cm) or typically 150 to 25 threads or yarns per inch (59-10 per cm). The fabric has a thickness of less than 3 mm and is typically greater than 0.10, 0.1 to for 0.2 to 0.8 mm in thickness. The article comprises a linear fabric having an indeterminate length but a width of less than 35 centimeters have a first edge portion and a second edge portion along the width of the article. The first edge portion and the second edge portion can have a defined width of 0.02 to about 5 or 0.1 to 2 centimeters. The width ($W_a$) of the fabric is typically less than 30 cm, 10 cm, is often 0.2-10 centimeters and can be about 0.5-5 centimeters.

The article is made by extruding the fabric with a thermoplastic material in an extrusion device in which the thermoplastic polymer is contacted in melt form at elevated temperatures with the yarn or fabric in a die. In such a fashion, the thermoplastic can contact and adhere to the fabric. The polymer can penetrate the yarn or fiber of the fabric to some degree the polymer can coat, partially embed or fully embed the yarn in the polymer. The polymer embeds the fabric in the surface layer of the polymer while at the same time forming a continuous layer of polymer on the fabric surface. As such, with a single layer of polymer, the fabric layer is exposed on one surface of the article while the polymer is exposed on the opposite surface of the article. Pre-coated yarn can be woven into a fabric.

The article comprises a polymer layer and a fabric layer. The polymer layer and the fabric layer can have identical width or different widths such that the fabric extends past the edge of the polymer layer or the polymer layer extends past the edge of the fabric. However, preferably the polymer and the fabric are coextensive. Typically the article is made in rolls such that the extruded article has an indeterminate length, the width discussed above and a thickness such that the thickness of the polymer layer and the fiber is less than 5 millimeters or 3 mm. The total thickness of the article can be 0.1 to 2 millimeters.

The article comprises a fabric layer and polymer such that the ratio of the amount of polymer to the area of fabric is about 0.01 to 1 g-cm$^{-2}$ or 0.02 to 0.6 g-cm$^{-2}$.

The article can be formed into a hollow profile. In forming the hollow profile, the substantially planar article comprising a layer of polymer and a partially or fully embedded fabric, can have a defined first and second edge portion along the periphery of the article. The ratio of the width of the article (Wa) to the width of an edge portion (We) (Wa:We) is less than or equal to about 20:1 to about 2:1. (See FIGS. 3 and 4). Each of the edge portion width portions can be the same or different in width, in forming the hollow profile article is manipulated such that the width of edge portion 1 and the width of edge portion 2 are contacted under conditions of heat and pressure, adhesive or other mechanical joining means to form an interior enclosed volume and a sealed article. When using a flexible polymer, the enclosed volume obtains a shape resulting in the minimum energy or formation of the hollow profile. If using a stiff polymer such as a urethane or epoxy thermoset, virtually any shape can be imposed into the profile.

In a preferred mode, the exterior of the hollow profile is the polymer layer with the fabric layer in the interior of the void space.

The cross-sectional area of the hollow profile (optionally a weather-strip) can be from about 0.05 to 2 in$^2$ or about 0.1 to 0.8 in$^2$ or from about 0.2 to 10 cm$^2$, 0.3 to 7 cm$^2$ or about 0.6 to 5 cm$^2$. In a second embodiment of the hollow profile, a second element can be added to the joint between edge portion 1 and edge portion 2. Such elements can include a flexible film, a rigid sheet, composite or joining placement means.

Both the article and the hollow profile are moisture resistant, non-extensible and have high tensile strength. The joint between side 1 and side 2 typically is formed by joining under conditions of heat and pressure, the use of an adhesive, the use of sewing or other mechanical fasteners.

Polymer Resin

A large variety of polymer materials can be used in the composites. For the purpose of this application, a polymer is a general term covering either a thermoplastic or a thermoset derived from natural or synthetic sources. We have found that polymer materials useful in the composites include both condensation polymeric materials and addition or vinyl polymeric materials. Included are both vinyl and condensation polymers, and polymeric alloys thereof. Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water or some other simple, typically volatile substance. Such polymers can be formed in a process called polycondensation. The polymer has a density of at least 0.85 at least 0.9 gm-cm$^{-3}$, however, polymers having a density of 0.94 to 1.4 gm-cm$^{-3}$ and preferably greater than 0.98 to 1.6 gm-cm$^{-3}$ are useful to increase density. Vinyl polymers include polyethylene, polypropylene, polybutylene, acrylonitrile-butadiene-styrene (ABS), polybutylene copolymers, polyacetyl resins, polyacrylic resins, homopolymers or copolymers comprising ethylene, $C_{3-12}$ α-olefins, vinyl chloride, vinylidene chloride, fluorocarbon copolymers, etc. Vinyl polymer polymers include a acrylonitrile; polymer of alpha-olefins such as ethylene, propylene, etc.; chlorinated monomers such as vinyl chloride, vinylidene dichloride, acrylate monomers such as acrylic acid, methyl acrylate, methyl methacrylate, acrylamide, hydroxyethyl acrylate, and others; styrenic monomers such as styrene, alpha methyl styrene, vinyl toluene, etc.; vinyl acetate; and other commonly available ethylenically unsaturated monomer compositions.

Another class of thermoplastic includes styrenic copolymers. The term styrenic copolymer indicates that styrene is copolymerized with a second vinyl monomer resulting in a vinyl polymer. Such materials contain at least a 5 mol-% styrene and the balance being 1 or more other vinyl monomers. An important class of these materials is styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

Condensation polymers that can be used in the composite materials include polyamides, polyamide-imide polymers, polyarylsulfones, polycarbonate, polybutylene terephthalate, polybutylene naphthalate, polyetherimides, polyethersulfones, polyethylene terephthalate, thermoplastic polyimides, polyphenylene ether blends, polyphenylene sulfide, polysulfones, thermoplastic polyurethanes and others. Preferred condensation engineering polymers include polycarbonate materials, polyphenyleneoxide materials, and polyester materials including polyethylene terephthalate, polybutylene terephthalate, polyethylene naphthalate and polybutylene naphthalate materials.

Polycarbonate engineering polymers are high performance, amorphous engineering thermoplastics having high impact strength, clarity, heat resistance and dimensional stability. Polycarbonates are generally classified as a polyester or carbonic acid with organic hydroxy compounds. The most common polycarbonates are based on phenol A as a hydroxy compound copolymerized with carbonic acid. Materials are often made by the reaction of a bisphenol A with phosgene (O=CCl$_2$). Polycarbonates can be made with phthalate monomers introduced into the polymerization extruder to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene, styrene maleic anhydride and others. Preferred alloys comprise a styrene copolymer and a polycarbonate. Preferred polycarbonate materials should have a melt index between 0.5 and 7, preferably between 1 and 5 g/10 min.

A variety of polyester condensation polymer materials including polyethylene terephthalate, polybutylene terephthalate, polyethylene naphthalate, polybutylene naphthalate, Polylactic Acid (PLA), etc. can be useful in the composites. Polyethylene terephthalate and polybutylene terephthalate are high performance condensation polymer materials. Such polymers often made by a copolymerization between a diol (ethylene glycol, 1,4-butane diol) with dimethyl terephthalate. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher Tg and higher stability at high temperature compared to the terephthalate materials. However, all these polyester materials are useful in the composite materials. Such materials have a preferred molecular weight characterized by melt flow properties. Useful polyester materials have a viscosity at 265° C. of about 500-2000 cP, preferably about 800-1300 cP. Polyester polymers are manufactured by the reaction of a dibasic acid with a glycol. Dibasic acids used in polyester production include phthalic anhydride, isophthalic acid, maleic acid and adipic acid. The phthalic acid provides stiffness, hardness and temperature resistance; maleic acid provides vinyl saturation to accommodate free radical cure; and adipic acid provides flexibility and ductility to the cured polymer. Commonly used glycols are propylene glycol which reduces crystalline tendencies and improves solubility in styrene. Ethylene glycol and diethylene glycol reduce crystallization tendencies.

Phenolic polymers can also be used in the manufacture of the structural members. Phenolic polymers or other thermoset typically comprise a phenol-formaldehyde polymer. Such polymers are inherently fire resistant, heat resistant and are low in cost. Phenolic polymers are typically formulated by blending phenol and less than a stoichiometric amount of formaldehyde. These materials are condensed with an acid catalyst resulting in a thermoplastic intermediate polymer called NOVOLAK. These polymers are oligomeric species terminated by phenolic groups. In the presence of a curing agent and optional heat, the oligomeric species cure to form a very high molecular weight thermoset polymer. Curing agents for novalaks are typically aldehyde compounds or methylene (—CH$_2$—) donors. Aldehyde curing agents include paraformaldehyde, hexamethylenetetramine, formaldehyde, propaldehyde, glyoxal and hexamethylene methoxy melamine.

The fluoropolymers are polymers made with monomers containing one or more atoms of fluorine, or copolymers of two or more of such monomers. Common examples of fluorinated monomers useful in these polymers or copolymers include tetrafluoroethylene (TFE), hexafluoropropylene (HFP), vinylidene fluoride (VDF), perfluoroalkylvinyl ethers such as perfluoro-(n-propyl-vinyl) ether (PPVE) or perfluoromethylvinylether (PMVE). Other copolymerizable olefinic monomers, including non-fluorinated monomers, may also be present.

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, and any other monomer that readily copolymerizes with vinylidene fluoride. These materials are further described in U.S. Pat. No. 4,569,978 (Barber) incorporated herein by reference. Preferred copolymers are those composed of from at least about 70 and up to 99 mole percent vinylidene fluoride, and correspondingly from about 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 percent trifluoroethylene. Terpolymers of vinylidene fluoride, trifluoroethylene and tetrafluoroethylene such as described in U.S. Pat. No. 2,968,649 and terpolymers of vinylidene fluoride, trifluoroethylene and tetrafluoroethylene are also representative of the class of vinylidene fluoride copolymers. Such materials are commercially available under the KYNAR trademark from Arkema Group located in King of Prussia, Pa. or under the DYNEON trademark from Dyneon LLC of Oakdale, Minn.

Fluorocarbon elastomer materials can also be used in the composite materials. Fluoropolymer contain VF$_2$ and HFP monomers and optionally TFE and have a density greater than 1.8 gm·cm$^{-3}$ fluoropolymers exhibit good resistance to most oils, chemicals, solvents, and halogenated hydrocarbons, and an excellent resistance to ozone, oxygen, and weathering. Their useful application temperature range is −40° C. to 300° C. Other monomers which can be copolymerized with these fluorinated (meth)acrylate monomers include alkyl (meth)acrylates, substituted alkyl (meth)acrylates, (meth)acrylic acid, (meth)acrylamides, styrenes, vinyl halides, and vinyl esters. The fluoropolymers can comprise polar constituents.

Engineering polymers that can be used in the composites include acrylic polymers. Acrylics comprise a broad array of polymers and copolymers in which the major monomeric constituents are an ester acrylate or methacrylate. These polymers are often provided in the form of hard, clear sheet or pellet. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for polymer grade applications are typically made either in bulk (continuous solution polymerization), followed by extrusion and pelleting or continuously by polymerization in an extruder in which unconverted monomer is removed under reduced pressure and recovered for recycling. Acrylic plastics are commonly made by using methyl acrylate, methyl methacrylate, higher alkyl acrylates and other copolymerizable vinyl monomers. Preferred acrylic polymer materials useful in the composites have a melt index of about 0.5 to 50, preferably about 1 to 30 gm/10 min.

Polymer blends or polymer alloys can be useful in manufacturing the pellet or linear extrudate. Such alloys typically comprise two miscible polymers blended to form a uniform composition. Scientific and commercial progress in the area of polymer blends has led to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature (Tg). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The polymer of the article or the hollow profile article can be clear, it can be colored by dye or pigment or can be printed with a legend or other design or printing.

The primary requirement for the substantially thermoplastic engineering polymer material is that it retains sufficient thermoplastic properties such as viscosity and stability, to permit melt blending or to be extruded molded in a thermoplastic process forming the useful product. Engineering polymer and polymer alloys are available from a number of manufacturers including Dyneon LLC, B.F. Goodrich, G.E., Dow, and duPont.

In certain applications or embodiments the articles can be made using a cured polymer. In such systems the fabric is drawn through a bath and pultruded through a die to form the coated fabric article. The resin systems used can be curable synthetic rubbers or silicone materials.

Fabric

The fabric is typically made from a natural cellulosic or proteinaceous fiber. Such fibers include seed fibers such as cotton, kapok, jute, etc. or blast fibers such as flax, ramie, hemp, nettle or bamboo. Such fibers also include animal sources. Animal fibers generally comprise proteins such as collagen, keratin and fibroin; examples include silk, sinew, wool, catgut, angora, mohair and alpaca. Animal hair (wool or hairs): Fiber or wool taken from animals or hairy mammals (e.g.) sheep wool, goat hair (cashmere, mohair), alpaca hair, horse hair, etc. Silk fiber: Fiber secreted by glands (often located near the mouth) of insects during the preparation of cocoons. Avian fiber: Fibers from birds, e.g. feathers and feather fiber.

| Chemical Composition of Cotton Fiber: | |
|---|---|
| Cellulose | 94% |
| Protein | 1.3% |
| Ash | 1.2% |
| Pectin | 1.2% |
| Oil, Fat and Wax | 0.6% |
| Sugar | 0.3% |
| Pigment | trace |
| Others | 1.4% |

| Chemical Composition of Jute Fiber: | |
|---|---|
| Cellulose | 65.2% |
| Hemicellulose | 22.2% |
| Lignin | 10.8% |
| Water soluble | 1.5% |
| Fats and wax | 0.3% |
| Chemical Composition of Linen/Flax Fiber: | |
| Cellulose | 92% |
| Hemicellulose | 2% |
| Lignin | 4% |
| Others | 2% |
| Chemical Composition of Hemp Fiber: | |
| Cellulose | 77.77% |
| Hemicellulose | 10% |
| Lignin | 6.8% |
| Pectin | 2.9% |
| Fat & wax | 0.90% |
| Water soluble | 1.73% |
| Chemical Composition of Sisal Fiber: | |
| Cellulose | 71.5% |
| Hemicellulose | 18% |
| Lignin | 6% |
| Pectin | 2.3% |
| Fat & wax | 0.5% |
| Water soluble | 1.7% |
| Chemical Composition of Coir Fiber: | |
| Husk | 14% |
| Fiber | 22% |
| Pith | 16% |
| Kernel | 30% |
| Water | 18% |
| Chemical Composition of Wool Fiber: | |
| Keratin | 33% |
| Dirt | 26% |
| Suint | 28% |
| Fat | 12% |
| Mineral matter | 1% |
| Chemical Composition of Keratin: | |
| Carbon | 50% |
| Hydrogen | 12% |
| Oxygen | 10% |
| Nitrogen | 25% |
| Sulfher | 3% |
| Chemical Composition of Silk Fiber: | |
| Fibroin | 76% |
| Sericin | 22% |
| Fat & wax | 1.5% |
| Mineral salt | 0.5 |

Such cellulosic fibers are useful in the article and hollow profile since they are somewhat absorbant and compatible with thermoplastic polymers, withstand high temperature, have low resiliency, low loft, good compressibility, resistant to deterioration and the environment. The preferred fiber for the fabric of the article and hollow profile is a cotton fiber. The preferred cotton fiber yarns have a denier of about 30 to 500 or about 40 to 400 and a tensile modulus of 2 to 10 or 3 to 5 g-denier. Fabrics typically have a warp fiber and a filler (weft) yarn made of natural fiber. The fabric can be isotropic or non-isotropic in yarn diameter, properties or yarn count in the warp and fill (weft) direction. The warp fiber typically is a fiber used in a looming process that extends from a source to a pickup and the lift or filling yarn is woven through alternating warp fibers across the direction of the movement of fabric through the loom. The weft is also characterized as a filling yarn. The thread or yarn count of a useful fabric can range from 200 threads of yarns per inch to 15 threads or yarns per inch (46-4 per cm) or typically 80 to 25 threads or yarns per inch (19-6 per cm). The article is a linear fabric having an indeterminate length but a width of as defined above and has a first edge portion and a second edge portion along the width of the article. The first edge portion and the second edge portion can have a defined width of 0.01 to about 0.5 centimeters. The fabric has a basis weight of about 50 to 500 or 100 to 400 g-m$^{-2}$. A useful fiber or fabric has an extensibility of less than 10%, less than 5% or less than 2%.

The thin strips used in manufacture of the articles can be made from larger sources of commercial fabric the can be 20 cm to 10 yards in width and formed into bolts or onto spools or other reel to reel forms. Such widths can be split into correct widths using conventional cutting technology.

After combining with polymer, the articles can be made by joining the first edge portion to the second edge portion along the defined width; the article can be formed into a hollow member with a seam having a width of 0.01 to 0.5 centimeters. Such a seam can be formed using the thermoplastic material of the coating, mechanical fasteners or by using as secondary thermoplastic or hot melted adhesive material as a joint material.

Glass

Figure 9:
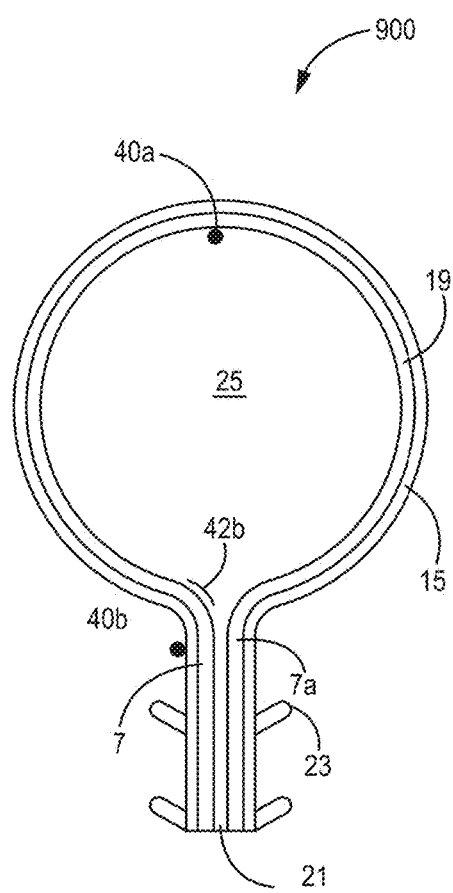
FIG. 9 is an end view of the hollow profile made from the composite. The joint surface is firmed with hold fast tabs. The profile can contain reinforcing member(s).
Figure 10:
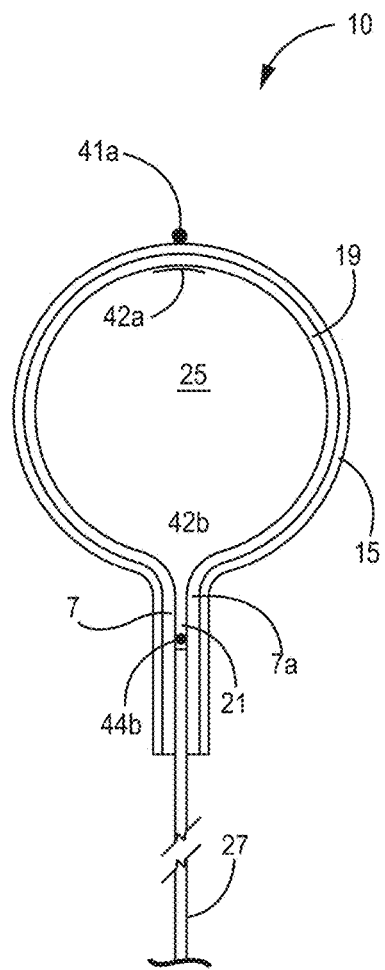
FIG. 10 is a view of the hollow profile made from the composite. The joint surface is firmed with a planar member joined to the hollow member by adhering the planar member in the joint between edge portion 1 and edge portion 2. The profile can contain reinforcing member(s).

As shown in FIGS. 9-10, the structure can contain a glass member or material in the form of a fiber, yarn, tow or fabric. The glass provides rigidity or longitudinal stability to the structure. Specifically the structure can be made to be substantially resistant to shrinkage or elongation. One or more glass members can be formed in the structure by placing it on one or more surfaces of the natural fiber fabric prior to or simultaneously with polymer extrusion or co-extrusion.

The glass-type used in the glass fiber material can be any type, including for example, E-glass, A-glass, E-CR-glass, C-glass, D-glass, R-glass, and S-glass. E-glass includes alumino-borosilicate glass with less than 1% by weight alkali oxides and is mainly used for glass-reinforced plastics. A-glass includes alkali-lime glass with little or no boron oxide. E-CR-glass includes alumino-lime silicate with less than 1% by weight alkali oxides and has high acid resistance. C-glass includes alkali-lime glass with high boron oxide content and is used, for example, for glass staple fibers. D-glass includes borosilicate glass and possesses a high dielectric constant. R-glass includes alumino silicate glass without MgO and CaO and possesses high mechanical strength. S-glass includes alumino silicate glass without CaO but with high MgO content and possesses high tensile strength. One or more of these glass types can be processed into the glass fiber materials described above. In particular embodiments, the glass is E-glass. In other embodiments, the glass is S-glass.

Glass fiber materials can include a single glass filament, a glass strand (tow of combined filaments), a glass yarn, a glass roving, a glass tape, a glass fiber-braid, unidirectional fabrics and tapes, an optical fiber, a glass roving fabric, a non-woven glass fiber mat, and a glass fiber ply. Glass fibers are formed by extrusion of thin strands from a melt silica-based formulation with diameters generally suitable for textile-type processing. Glass filaments include high aspect ratio glass fibers having diameters ranging in size from between about 1 micron to about 50 microns. Glass strands or tows are generally compactly associated bundles of filaments and are usually twisted together to give yarns. The maximum width of the glass member is the width of the natural fiber fabric, but is often less than half the width. The minimum with is the diameter of a single fiber that can range from about 1 micron to 50 microns. Commonly the glass member is a yarn, tow or fabric made by combining fiber into a width that is less than about 5 mm, is often about 0.05 to 3 mm.

Yarns include closely associated bundles of twisted fiber, filaments or strands. Each filament diameter in a yarn is relatively uniform. Yarns have varying weights described by their 'tex,' expressed as weight in grams of 1000 linear meters, or denier, expressed as weight in pounds of 10,000 yards, with a typical tex range usually being between about 5 g-$10^{-3}$ meters to about 400 g-$10^{-3}$ meters.

Rovings include loosely associated bundles of untwisted fiber, filaments or strands. As in yarns, filament diameter in a roving is generally uniform. Rovings also have varying weights and the tex range is usually between about 300 g-$10^{-3}$ meters and about 4800 g-$10^{-3}$ meters. Where filaments are gathered together directly after the melting process, the resultant bundle is referred to as a direct roving. Several glass strands can also be brought together separately after manufacture of the glass, to provide an assembled roving. Assembled rovings usually have smaller filament diameters than direct rovings. This can provide the roving with better wet-out and mechanical properties.

Glass tapes (or wider sheets) are materials that can be drawn directly from a glass melt or assembled as weaves, but have a width of up to 3 mm. Glass tapes can vary in width and are generally two-sided structures similar to ribbon.

Glass fiber-braids represent rope-like structures of densely packed glass fibers. Such structures can be assembled from glass yarns, for example. Braided structures can include a hollow portion or a braided structure can be assembled about another core material.

In some embodiments a number of primary glass fiber material structures can be organized into fabric or sheet-like structures. These include, for example, glass roving fabric, non-woven glass fiber mat and glass fiber ply, in addition to the tapes described above. Such higher ordered structures can be assembled from parent tows, yarns, rovings, filaments or the like.

| Useful Glass fiber | | | |
|---|---|---|---|
| Fiber property | | | |
| Diameter (mm) | 0.5-5 | 0.8-4 | 1-3 |
| Tensile strength (GPa) | 1-10 | 1.2-8 | 1.5-6 |
| Elongation (%) | <5 | <2 | <1 |
| Yield (g-kM$^{-1}$) | 100-5000 | 110-2500 | 120-2000 |

The tows can have a circular cross section or can be oval or elliptical in cross section. The major dimension ($d_{ma}$) can be greater than the minor dimension ($d_{mi}$) of the finer in cross section [$d_{ma}$=10–1.1*$d_{mi}$].

Composite Manufacture

In the manufacture of the composition of the invention, the manufacture and procedure requires two important operations that can be done in series or in parallel and can be done in serial dies or in a single die. A first fabric preform step and a second resin/fabric extrusion step.

During the preform step, the fabric or two or more fabric plies or optional glass member(s) are formed into an appropriate shape (angular, circular, oval, see FIGS. 4, 9, 10, 13 etc.) prior to combination with the appropriate resin material. We have found that the preform step imposes a useful shape into a fabric that is substantially the same as the shape required in the final structural member. Optionally, a preform step introduces an edge fold along the lateral edge of the fabric as it passes into the die. The folded fabric can also have any arbitrary shape. Such a shape can include a simple angle, a simple or complex curve having one, two or more diameters. The curves can be convex on one side and concave on that same side. Further, the fabric can be formed into a closed surface having a triangular, square, rectangular, circular, oval, hexagonal, heptagonal or other cross-section. The fabric can be formed into virtually any arbitrary shape conforming to the end use.

Such shapes can conform to a circular or oval cross-section tube, a rail, a quarter-round, half-round or other shape, a jamb a hollow or filled style, a sill having portions of the linear extrudate shaped to the form of a double hung member, a track shape having a passageway for one, two or more units such as a track for a double hung window, a sliding glass door, etc. The member can comprise stop or sash members or can comprise portions that are non-structural trim elements such as grill, cove, bead, quarter-round, repair pieces, etc. A shaping die can comprise a simple die which forms the fabric into an appropriate shape or can comprise a series of dies that slowly conforms the fabric into an appropriate shape for combination with the melt polymer. Such a step wise confirmation of the fabric into the appropriate shape can be done smoothly with a smoothly changing surface that conforms the fabric into an appropriate shape. Further, such a preforming step can be done in discrete stages in which the fabric passes through two, three or more shaping stages resulting in the formation of a final profile product with one or more resin additions.

The preferred equipment for combining fabric and melt polymer and extruding the composite of the invention is an industrial extruder device. Such extruders can be obtained from a variety of manufacturers. The extruder used to combine melt resin and fabric can contact a single or opposite sides of the shaped fabric with one or more melt resins. For certain applications, the single or twin screw extruder can introduce the resin into only one side of the fabric recognizing that the pressure of the contact will tend to force the melt resin into and through the fabric resulting in some resin covering all fiber surfaces to a controlled degree of embedding.

Resin and fabric are then contacted in appropriate proportions in the extruder die and simultaneously introduced into the mixing station at appropriate feed ratios to ensure appropriate product composition. Before contact the fabric can be preheated or pre-coated to improve melt wet-out.

In one mode, the fabric and resin is directed into a single die that can introduce a shape and add resin. The amount of resin and fabric are adjusted to ensure that the composite material contains appropriate proportions on a weight or volume basis. The shaped fabric is introduced into a shaping/extrusion die device with a section of the unit that imposes a shape, a section that combines resin and fabric and an exit section. Each section has a desired heat profile resulting in a useful product. The materials are introduced into the extruder-and are initially heated to a temperature that can maintain an efficient melt flow of resin. The final stage of extrusion insures contact where fabric and fiber are intimately contacted and combined.

In another mode, the fabric is placed in a series of separate stations to accomplish the shaping and combining stages.

The article is manufactured by a process in which the fabric is introduced into an extrusion or extruder and combined under conditions of heat and pressure with the polymer such that the polymer either fully embeds or partially embeds the fabric into the polymer layer. The polymer is added onto the fabric at a rate of about 0.01 to 1 grams or 0.02 to 0.5 grams per square centimeter of article.

Thermoset Process

Product may be produced using a typical pultrusion process. The process involves pulling the fabric through a bath where the fabric is wetted out/impregnated with the resin matrix (resin, fillers, additives), then passed through forming guides before entering the heated die where the laminate is cured and takes on its cross sectional shape. The temperature of the die is carefully controlled to ensure that the composite is fully cured. The finished article is pulled through the system with a pulling device. The output rates are determined by the curing dynamics. The finished article may be cut to determined lengths as is appropriate for the application. The cloth may be reeled off rolls.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to FIGS. 1 to 28, various illustrations are provided representing an example thermoplastic process, and resulting structural members. A thermoplastic process is continuous in nature and is utilized to manufacture composite materials having a constant cross sectional profile. In an example operation, one or more material webs are extruded with thermoplastic resin, through a heated die. As discussed above, any resin types may be used including thermoplastic or thermoset resins that include polyester, polyurethane, vinylester and epoxy. The resin may also include pigment such that the resulting structural member can be provided with a desired color.

In example embodiments, one or more of the material webs is a fabric formed from a biologically derived material, for examples organic or biodegradable materials which may be a recycled or non-recycled material. Preferred examples of usable biologically derived fabric materials are plant based materials (e.g. cotton, flax, wood pulp based products such as paper, etc.). Other natural fibers include animal based materials (e.g. wool, silk, etc.), and biodegradable plastics (e.g. polylactic acid yarns). Many organic based (i.e. plant or animal) cloths or fabrics can be woven to have significantly greater strength in multiple directions than other types of fabrics, such as fiberglass or carbon fiber fabrics that tend to have greater isotropic characteristics.

Referring to FIG. 1 showing a fabric surface of the extruded Article 101. In FIG. 1 the warp yarn 11 and the weft or fill yarn 13 are shown coated by polymer (transparent layer over fabric).

Figure 2:
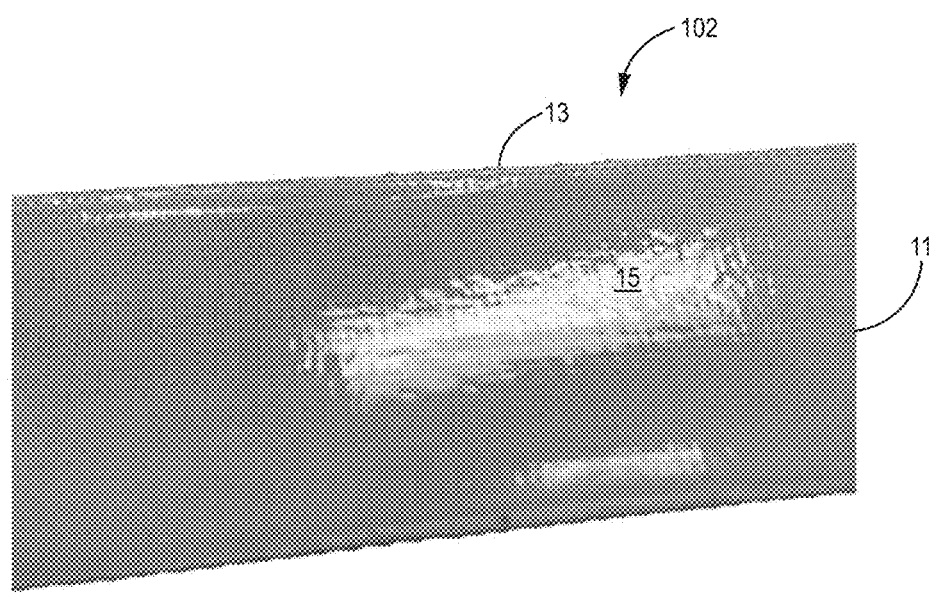
FIG. 2 is an isometric view of the composite with polymer covering the fabric.

FIG. 2 shows the Article 102. In FIG. 2, the warp yarn 11 and the weft yarn 13 are shown fully embedded in and covered by polymer 15.

Figure 3:
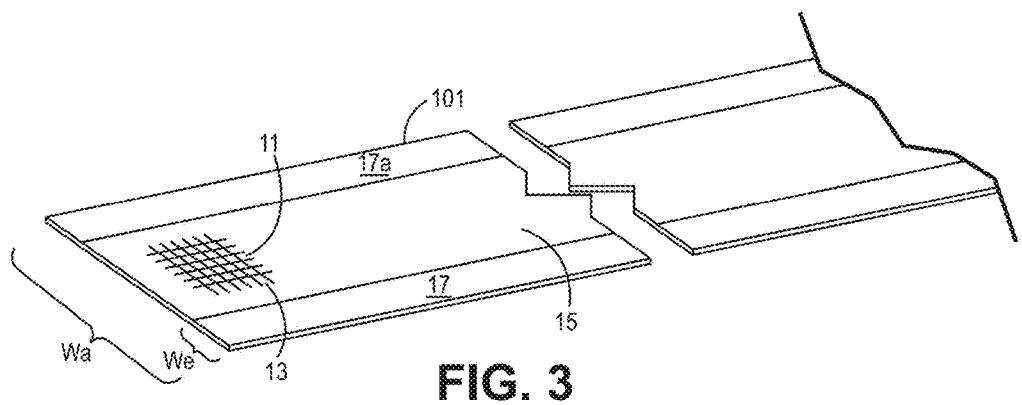
FIGS. 3 and 4 are end views showing the depth of penetration of polymer resin into the fabric.
Figure 4:
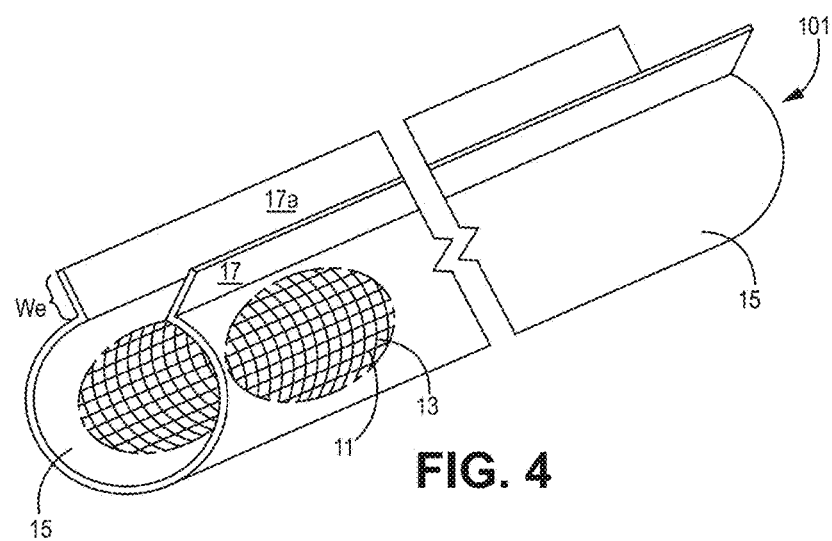

FIGS. 3 and 4 show the Article 101 configured to form the hollow member of FIGS. 9 and 10. In FIGS. 3 and 4 the Article 101 comprises a fabric comprising warp 11 and weft 13 fully embedded in and covered by polymer 15 on both sides of the Article 101. Of Article 101 edge portions 17 and 17(a) are defined. The edge portions can be defined after extrusion into a planar structure or, using the extruding device or dye of FIG. 28, the profile of FIG. 4 can be extruded with the edge portions 17 and 17(a) defined by the dye shape.

FIGS. 3 and 4 also show the width of the article (Wa) and width of the edge portion (We). In forming the hollow member of FIGS. 9 and 10, the edge portions 17 and 17(a) are contacted such as these edges are a coextensive and are substantially identical in dimensions optimizing the contact area of the seal. The contact surface of edge portion 17 and 17(a) can be made of a thermoplastic material that can thermoplastically bond naturally using heat or the edge portions can be coated with a thermoplastic or thermosetting adhesive material that can add further adhesion characteristics to the article.

Figure 5:
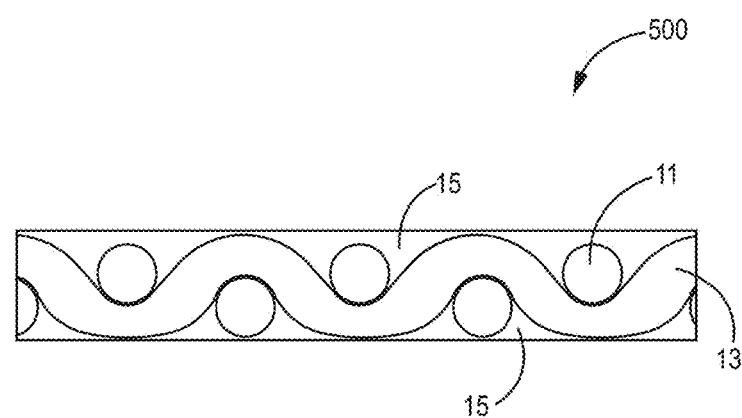
FIGS. 5 and 6 are end views showing the varied depth of penetration of polymer resin into the fabric.
Figure 6:
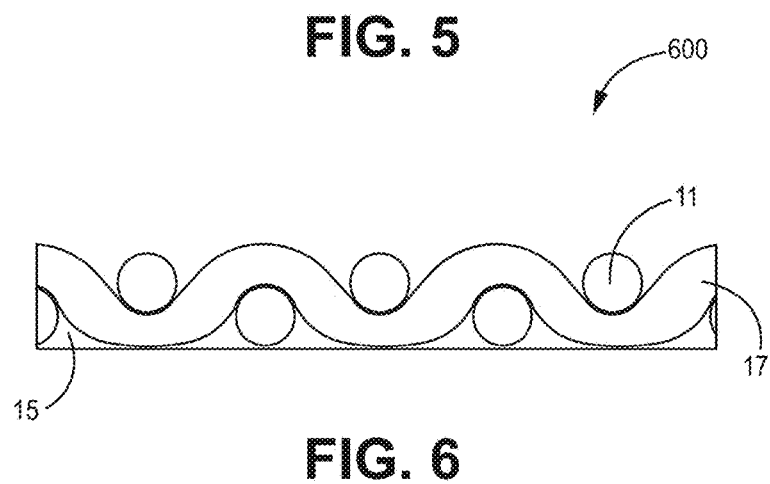
Figure 7:
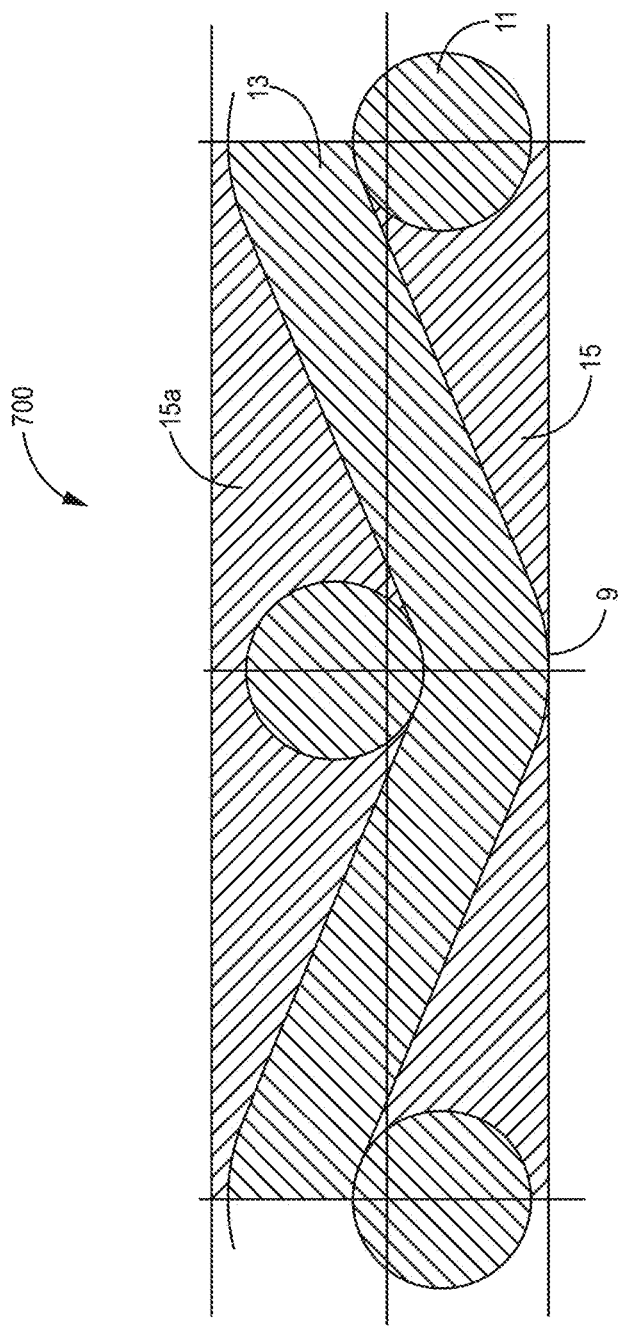
FIG. 7 and FIG. 8 are end views showing the varied depth of penetration of polymer resin into the fabric.

FIGS. 5-8 show that the planar article can be made with various amounts of polymer with respect to the fabric material. Either the fabric can be fully embedded in portions of one side or others can be exposed by polymer. In FIGS. 5 through 8, the fabrics is represented by warp yarn 11 and weft or fill yarn 13 wherein the yarns 11 and 13 are formed with varying amounts of polymer 15. In FIG. 5, Article 500 is fully coated such that no yarn is exposed outside the polymer layer. In FIG. 6, Article 16 shows that a single side of Article 600 is coated with polymer 15. FIG. 7 shows Article 700 wherein a small portion 9 of the weft or fill fiber 13 remains uncovered by the polymer material. Otherwise the yarn of the fabric is fully embedded in the polymer layer.

Figure 8:
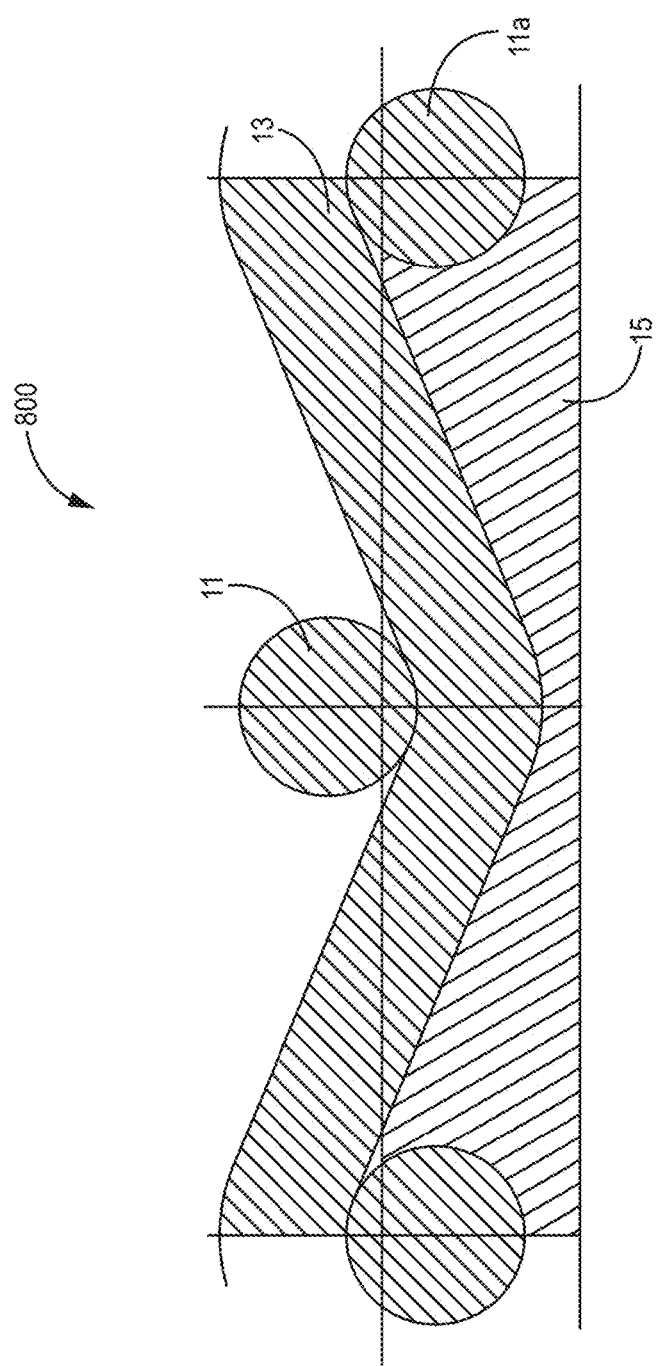

FIG. 8 shows the Article 800 wherein the fabric obtains one warp fiber 11 that is not coated with any polymer whereas alternating warp fibers 11 and 11(a) are fully embedded in the polymer. Further one surface of the weft fiber 11 is coated with a polymer thus exposing a portion of the warp and weft without polymer coating.

FIGS. 9 and 10 show a hollow member 900, 10 with a hollow internal void space 25. The Article 900, 10 is made from a fabric 19 with a polymer coating 15. The hollow member 900 is formed by joining edge portion 7 and edge portion 7(a) at joint 21 using a thermoplastic process. The Article 900 can contain one or more optional glass reinforcing members, and placement options are shown for the glass tows 40a, 40b, or glass tape 42b.

In FIG. 9 the Article 900 is formed with position barbs also known as hold fast tabs 23 that can be used to hold the Article 900 in a group or space. Alternatively a right or a left helical hold fast or corkscrew structure can be used. The Article 900 can contain one or more optional glass reinforcing members, and placement options are shown for the glass tows 41a, 41b, or glass tape 42a.

In FIG. 10, Article 10 is shown with a sheet like flexible or rigid member 27 adhered to joint space 21 adjacent to edge portions 7 and 7(a).

Figure 11:
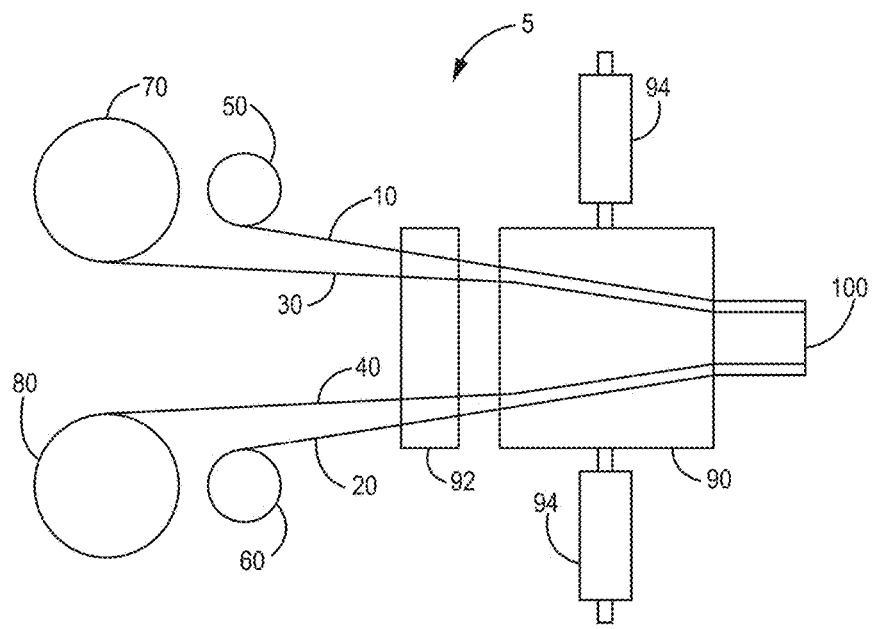
FIG. 11 is a schematic view of a thermoplastic system having features that are examples of aspects in accordance with the principles of the present disclosure.
Figure 20:
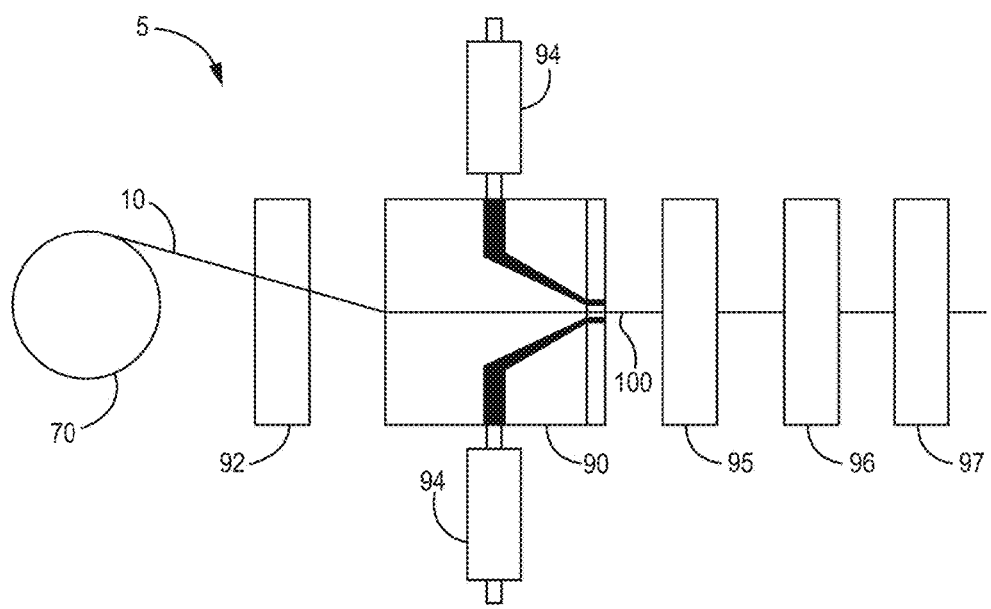
FIG. 20 is a schematic view of the thermoplastic system of FIG. 11, wherein only one webbing roll is utilized to form a composite member.

In FIG. 11, a thermoplastic machine 5 and co-extrusion process are shown in which a first web 10, and optionally a second web 20, a third web 30, and a fourth web 40 are pulled together through a die 90 to form a hollow structural member 100. As shown, each of the webs 10, 20, 30, and 40 is fed from corresponding rolls 50, 60, 70, and 80 such that the structural member 100 is formed as a lineal extrusion. Although one, two, three, or four webs 10, 20, 30, 40 are shown as being utilized with extrusion machine 5, it is noted that fewer or more webs may be utilized (see FIG. 20), as desired and as also shown with respect to the embodiments of FIGS. 14-15 and 21-27, without departing from the concepts herein. With reference to FIG. 20, the extrusion machine 5 of FIG. 11 has been adjusted such that only a single web 10 is utilized to produce a composite structure 100. In such a configuration, the resulting composite structure 100 will be formed from the material used for the web 10 and the resin introduced at injectors 94. The various forming station 5 configurations shown in the drawings can also be provided with additional equipment or features, such as calibration station 95 to aid in additionally curing the structure 100, a puller station 96 for pulling web 10 through the die 90 and other components, and a saw or cutting station 97 for creating a composite structure 100 having a desired length, as is shown schematically at FIG. 20.

Figure 12:
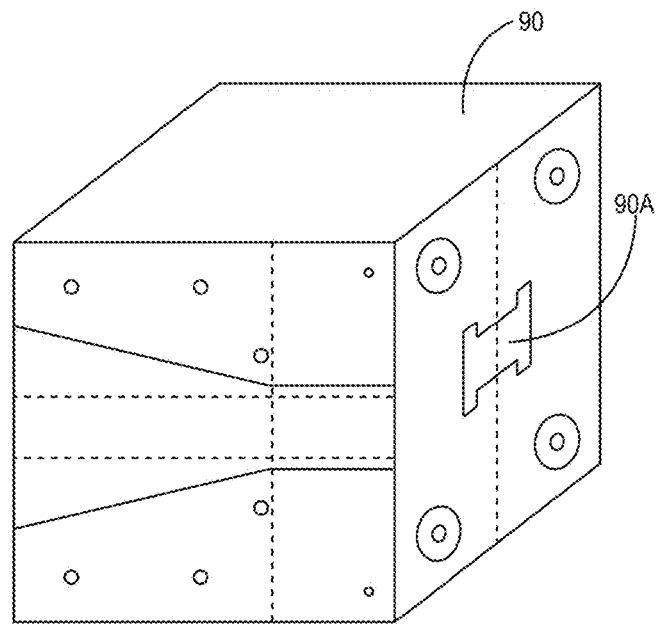
FIG. 12 is a perspective view of a die usable in the thermoplastic system shown in FIG. 11.

FIG. 12 shows an exemplary die 90 with an outlet shape 90A configured to form one or more of the webs 10, 20, 30, and 40 into a hollow structural member. However, it is noted that although each of the structural members depicted herein are shown as having the same cross-sectional profile, many other open or closed cross-sectional shapes are possible based on the outlet shape 90A chosen. For example, cross-sections including those having relatively complex profiles having one or more angles, one or more curved surfaces, one or more folded or rolled edges, or more areas where the fabric is folded back and doubled up with two or more folds, at an edge or at an interior location (discussed later). Examples of other possible profile shapes include cylindrical profiles, triangular profiles, oblong profiles, C-shaped channel profiles, H-shaped profiles, and L-shaped profiles.

Figure 13:
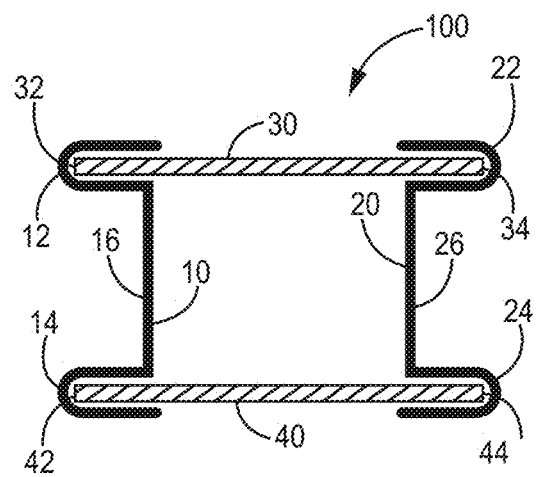
FIG. 13 is a cross-sectional view of a first embodiment of a composite structural member producible by the thermoplastic system shown in FIG. 11.
Figure 14:
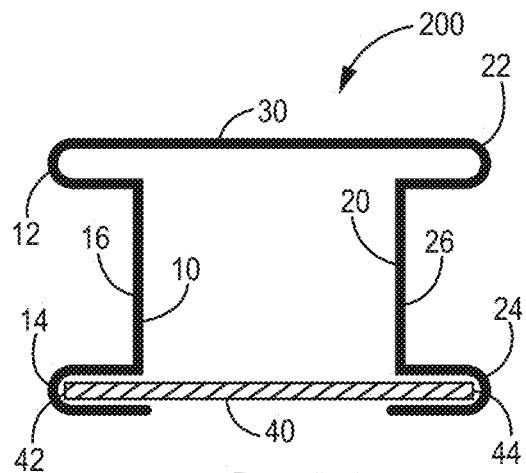
FIG. 14 is a cross-sectional view of a second embodiment of a composite structural member producible by the thermoplastic system shown in FIG. 11.
Figure 15:
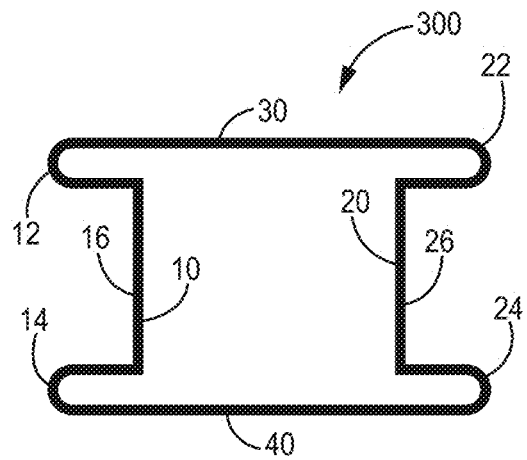
FIG. 15 is a cross-sectional view of a third embodiment of a composite structural member producible by the thermoplastic system shown in FIG. 11.

Referring to FIGS. 13-15, several different embodiments of structural members that can be produced from co-extrusion machine 5 and die 90 are shown. As many of the concepts and features are shared among the embodiments presented in FIGS. 13-15, the description for each embodiment is hereby incorporated by reference for every other embodiment. Where like or similar features or elements are shown, the same reference numbers will be used where possible.

Referring to FIG. 13, the first and second webs 10, 20 are formed from a fabric material, such a cotton based fabric, while the third and fourth webs 30, 40 are formed from metal. In one embodiment, the first and second webs 10, 20 are provided as a resin impregnated fabric. In one embodiment, the metal webs 30, 40 are solid and are not impregnated with resin and may or may not be coated with resin. In one embodiment, the metal webs 30, 40 are a metal fabric that is impregnated with resin. As shown, first web 10 is formed within die 90 to have a first end 12 that wraps around a first end 32 of the third web 30 and is formed to have a second end 14 that wraps around a first end 42 of the fourth web 40. Likewise, the second web 20 is formed within die 90 to have a first end 22 that wraps around a second end 34 of the third web 30 and is formed to have a second end 24 that wraps around a second end 44 of the fourth web 40. As configured, the structural member 100 has side extensions 16, 20 that provide for a separation distance between the third and fourth webs 30, 40. The combination of using a fabric material for the first and second webs 10, 20 and a metal material for the third and fourth webs 30, 40 results in a structural member 100 with improved strength and thermal barrier (i.e. low conductivity) characteristics that is particularly well suited for many uses, for example as a spacer for double pane windows.

FIG. 14 shows a structural member 200 in which only one of the webs, the fourth web 40, is provided as a metal material. In the embodiment of FIG. 14, the first, second and third webs 10, 20, 30 may be provided as a singular web or may be provided as separate webs that together form the resulting structure 200.

FIG. 15 shows a fabric composite structural member 300 free of metal in which none of the webs is provided as a metal material. In the embodiment of FIG. 15, the first, second, third, and fourth webs 10, 20, 30 may be provided as a singular web or may be provided as separate webs that together form the resulting structure 300. As noted previously, it is to be understood that the structural members 100, 200, and 300 are provided as examples and the application is not necessarily limited to the cross-sectional shape and material combinations shown.

FIGS. 16-19 are presented to diagrammatically show different portions of a formation process that are most closely related to the formation of structural member 200 where the first, second, and third webs 10, 20, 30 are simply portions of a common web and a single metal web 40 is utilized. However, it is noted that the following description includes many features and aspects with applicability to the formation of structural members 100 and 300, in addition to many other desired structural member configurations.

Figure 16:
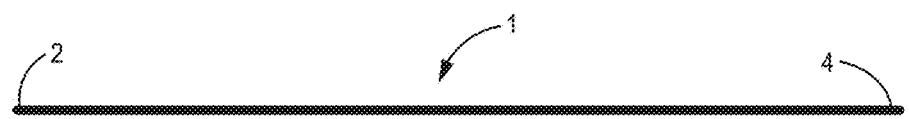
FIG. 16 diagrammatically shows a first stage of a process for making a composite structural member.
Figure 17:
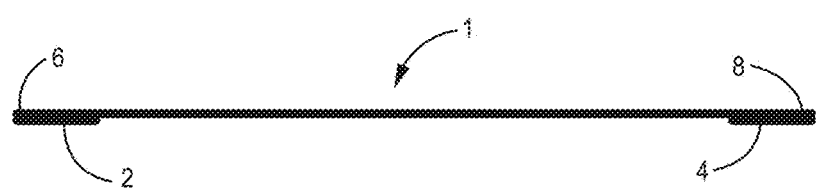
FIG. 17 diagrammatically shows a second stage of a process for making a composite structural member.

Referring to FIG. 16, a first step in the process of forming a structural member 100 is the provision of a material web 1 extending between a first lateral side 2 and a second lateral side 14. In a second step, as shown in FIG. 17, the material web 1 has been subject to a folding process in which the first lateral edge 2 has been folded to form a first side edge 16 and the second lateral edge 14 has been folded to form a second side edge 8. This folding step can be performed as a preforming step prior to introduction of the web(s) 10 into the die 90, for example at preforming station 92. The folding step aids in providing a dimensionally stable web and a strong composite.

As is known, fabrics can fray at an edge which can be exacerbated by application of a flow of resin against the exposed fabric edge disrupting the warp and weft of the fabric. The frayed edges can have randomly oriented fiber and can have fiber removed from the weave resulting in a poorly formed edge with unsatisfactory geometry. Such problems can be solved by introducing a fold into each edge of the fabric. Typically, the edges folded are the lateral edges in the sense that the edges are on the sides of materials as they are incorporated into the extrusion machines. A single fold can be used, however, a double fold or triple fold can be used resulting in a structure having two, three, four or more layers of fabric in the fold. The fold width, measured from the lateral edge of the fold can be approximately 0.05 to 5 centimeters, preferably about 0.1 to 3 centimeters. The folding or preforming can be done in one or more stations or steps. Pre-folding the fabric prior to the introduction of melt fiber results in a strengthened edge and an edge in which the folded materials, incorporated with resin are strong, resilient and resist mechanical stress. In one embodiment, the pre-fold can be achieved using a preforming die upstream of die 90 that folds the edges over.

Figure 18:
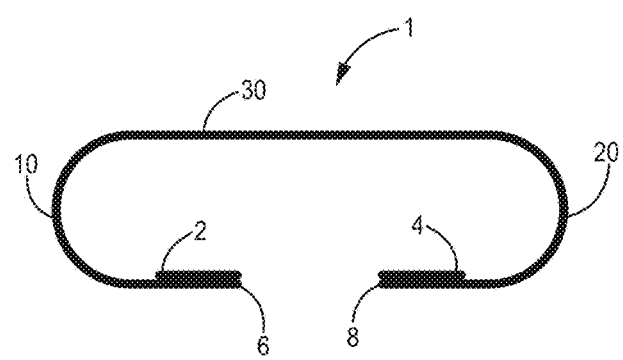
FIG. 18 diagrammatically shows a third stage of a process for making a composite structural member.
Figure 19:
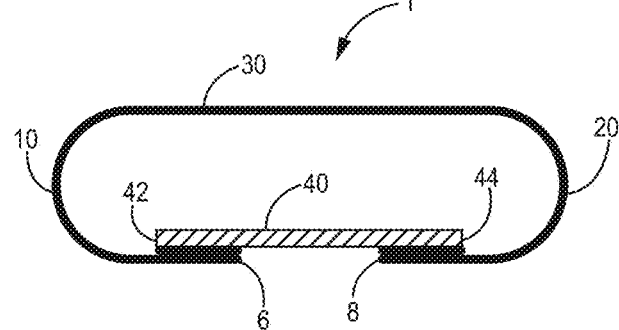
FIG. 19 diagrammatically shows a fourth stage of a process for making a composite structural member.

Referring to FIG. 18, the material web 1 has been formed within die 90 such that the web portions 10, 20, and 30 are initially defined. As the material web 1 passes through the die 90, the shape of the material web 1 will gradually transition from the shape shown at FIG. 18 into the shape shown at FIG. 14. At some point within the die, and as shown at FIG. 19, the fourth web 40 is introduced and placed adjacent to and across the side edges 6, 8 of the material web 1. Accordingly, as the material web 1 further progress through the die 90, a second end 14 of the web portion 10 will wrap around the first end 42 of the fourth web 40 while a second end 24 of the web portion 20 will wrap around the second end 44 of the fourth web 40.

In one embodiment, (FIG. 20) a die 90 (see also FIG. 28) is provided that is provided with fabric 10 form roll 70, injectors 94 for introducing the resin to the fabric (material web) within the die 90. The injectors 94 can also include a pump. In one embodiment, the material webs are pre-coated with a resin before being introduced into the die 90. The various forming station configurations shown in the drawings can also be provided with additional equipment or features, such as calibration station 95 to aid in additionally curing the structure 100, a puller station 96 for pulling web 10 through the die 90 and other components, and a saw or cutting station 97 for creating a composite structure 100 having a desired length, as is shown schematically at FIG. 20.

Figure 21:
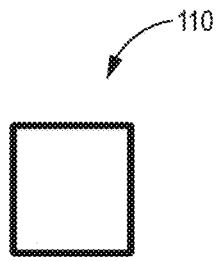
FIG. 21 is a schematic cross-sectional view of a fourth embodiment of a composite structural member 110 producible by the thermoplastic systems shown in FIG. 11 and FIG. 20.
Figure 22:
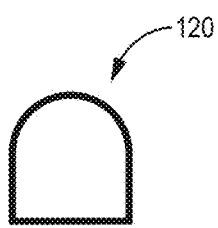
FIG. 22 is a schematic cross-sectional view of a fifth embodiment of a composite structural member 120 producible by the thermoplastic systems shown in FIG. 11 and FIG. 20.
Figure 26:
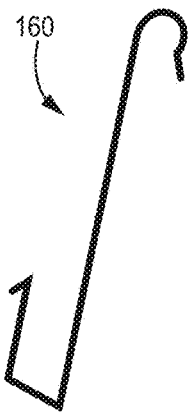
FIG. 26 is a schematic cross-sectional view of a ninth embodiment of a composite structural member 160 producible by the thermoplastic systems shown in FIG. 11 and FIG. 20.
Figure 23:
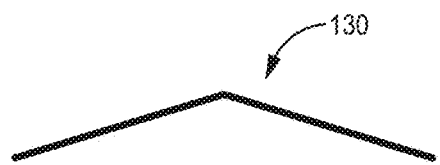
FIG. 23 is a schematic cross-sectional view of a sixth embodiment of a composite structural member 130 producible by the thermoplastic systems shown in FIG. 11 and FIG. 20.
Figure 24:
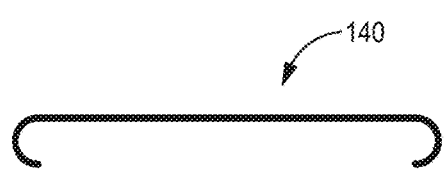
FIG. 24 is a schematic cross-sectional view of a seventh embodiment of a composite structural member 140 producible by the thermoplastic systems shown in FIG. 11 and FIG. 20.
Figure 27:
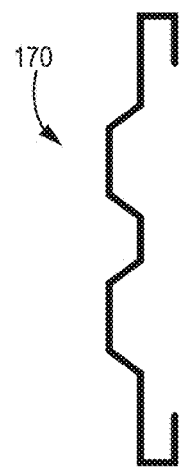
FIG. 27 is a schematic cross-sectional view of a tenth embodiment of a composite structural member 170 producible by the thermoplastic systems shown in FIG. 11 and FIG. 20.
Figure 25:
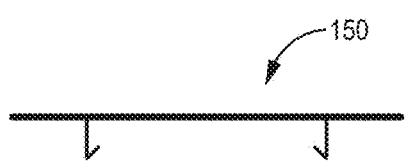
FIG. 25 is a schematic cross-sectional view of an eighth embodiment of a composite structural member 150 producible by the thermoplastic systems shown in FIG. 11 and FIG. 20.

Some of these profiles are shown at FIGS. 21-27 wherein FIG. 21 shows a hollow or rectangular profile and FIG. 22 shows a hollow oval profile. In the case of a closed profile, a mandrel may be used within die 90 about which the profile may be formed and supported. In other examples, FIG. 23 shows a trim piece, FIG. 24 shows a cover piece, FIG. 25 shows a fascia having integrally formed clips, FIG. 26 shows a siding member, and FIG. 27 shows a jamb piece. Of course, many other profiles are possible using any number of webs, for example one web, two webs, three webs, and four webs.

Figure 28:
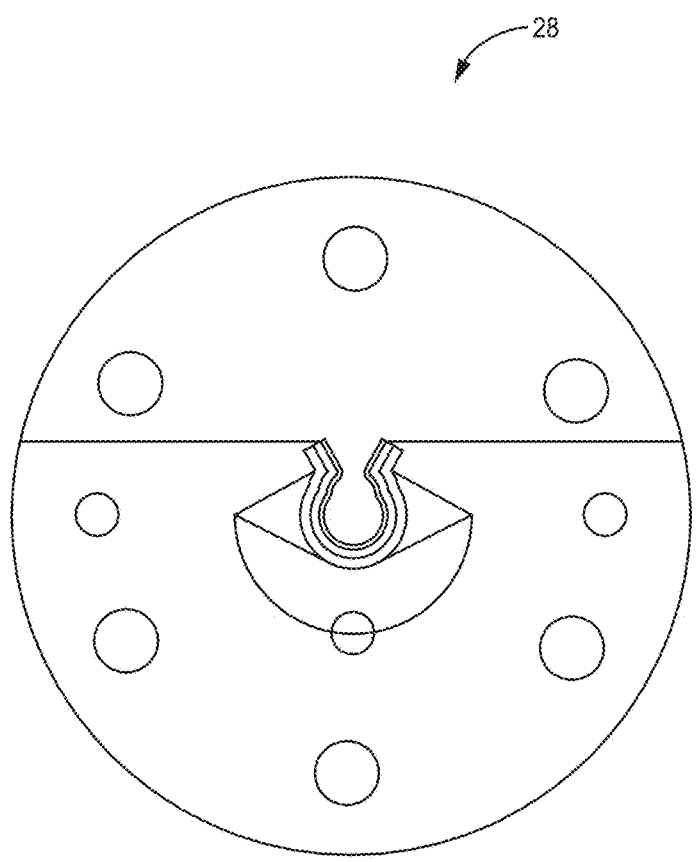
FIG. 28 is a planar view of a thermoplastic extruder die system wherein only one fabric is embedded in the thermoplastic material.

FIG. 28 shows a die design for extruding the profile of FIG. 4.

Figure 29:
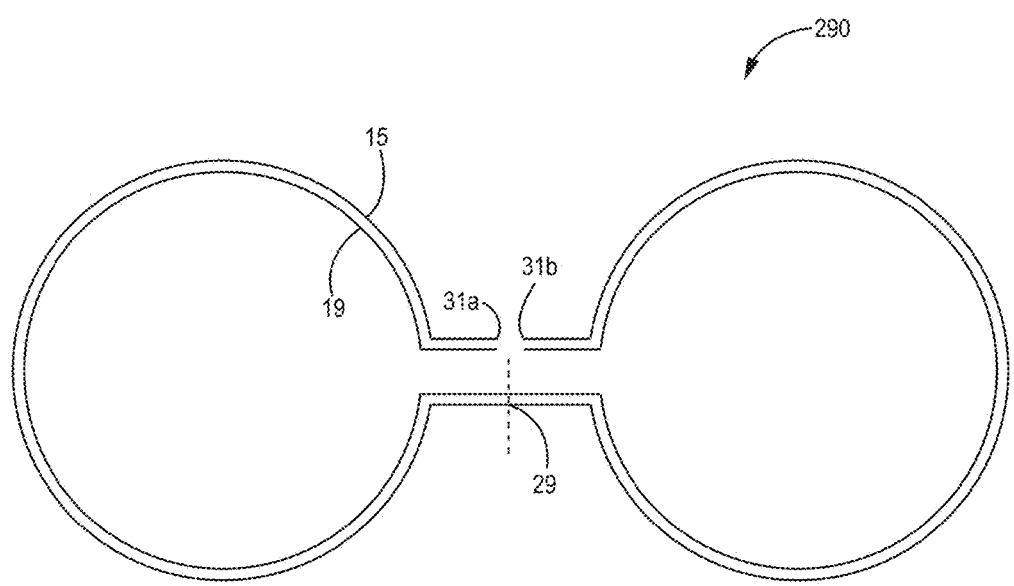
FIG. 29 is an end view of an intermediate form of the extruded article.

FIG. 29 is an end view of an intermediate form of the extruded article. The article 290 is extruded as a doubled article. The extrudate is made by embedding fabric 19, with periphery edge 31a and 31b, in resin 15 is an appropriate die shaped to form the article 29. The resulting article can be split at line 29 to form two articles of FIG. 4, 9 or 10.

Thermal Cycle Regimen—Shrinkage Testing

Specimen Preparation

Measurements were conducted in a temperature controlled environment.

Shrinkage testing was performed on extruded strips approximately 4 centimeters wide. Preshrunk or compacted fabric was coated with PVC in an extrusion head embedding the fabric in polymer.

Strips were cut into lengths of 35.5 centimeters. Triplicate samples of each test specimen were used. The goal is to obtain longitudinal shrinkage in a composite article of less than 0.4 or less than 0.2%.

At approximately 2.5 centimeters from the initial end of the strip a line is scribed or drawn into the material. Another line is scribed or drawn 30 cm from initial scribed line using a graduated ruler with 0.10 cm degradations. Distance from line to line was documented using an electronic digital caliper.

Conditioning

Thermal conditioning of samples is to be performed in a thermal chamber capable of reaching 180° F. and −20° F. at no less than 1° F. per minute and holding temperatures at plus or minus 2° F.

Placement in the chamber consists of laying the samples flat on a center rack in the test chamber with sides of samples no less than 1 cm from each other or from the sides of the chamber.

Conditioning Conditions

Initial Temperature 70° F.

Increase temperature 1.2° F. per minute to 180° F.

Hold at 180° F. for one hour

Decrease temperature 1.2° F. per minute to −20° F.

Hold at −20° F. for one hour.

A cycle for our purposes is defined as one iteration of 1.2° F. per minute from either starting position of 180° F. or −20° F.

A regimen of 25 to 100 cycles is to be performed on the samples and a 1 hour hold at 70° F. is to be done before measurements are taken.

Measurements are to be taken in the same temperature controlled environment as the initial measurements were taken.

Measurements are to be made using the same graduated ruler and digital caliper.

The embodiments can include a planar article, the article having an indeterminate length, a width of about 0.1 to 50 cm and a thickness of about 0.2 to 5 mm, the article consisting essentially of:
(a) A natural fiber fabric; and
(b) An extruded resin layer;
the fabric comprising a basis weight of about 50 to 500 g-m$^{-2}$, warp fiber and a fill fiber, the fabric having a count of about 50 to 4 fibers-cm$^{-1}$, each fiber having a diameter of 30 to 500 denier, the article comprising an add on amount of polymer to fabric of about 0.005 to about 1 g-cm$^{-2}$, a polymer layer thickness of less than-4 mm, a fiber tensile modulus greater than about 2-10 g-denier$^{-1}$.

The article has a warp and a weft, the warp and weft comprising the yarn wherein the yarn comprises about 40 to 400 denier, and a shrinkage of less than 0.4% in either length or width. The yarn has a count in the warp or weft of 50-4 fibers per centimeter. The planar article, the article has an indeterminate length, a width of about 0.1 to 50 cm and a thickness of about 0.2 to 5 mm, the article consisting essentially of:
(a) a natural fiber fabric;
(b) an extruded resin layer; and
(c) a glass fiber reinforcement fiber, tow or tape;
the fabric comprising a basis weight of about 50 to 500 g-m$^{-2}$, warp fiber and a fill fiber, the fabric having a count of about 50 to 4 fibers-cm$^{-1}$, each fiber having a diameter of 30 to 500 denier, an add on amount of polymer to fabric of about 0.005 to about 1 g-cm$^{-2}$, a polymer layer thickness of less than 4 mm, a fiber tensile modulus greater than about 2-10 g-denier$^{-1}$, and a shrinkage of less than 0.4% in either length or width. The fabric comprises a warp and a weft, the warp and weft comprising the yarn wherein the yarn comprises about 40 to 400 denier. The article has a count in the warp or weft of 50-4 fibers per centimeter. A hollow article formed from a planar article can have an indeterminate length, a width of about 0.1 to 10 cm and a thickness of about 0.2 to 5 mm, the article consisting of:
(a) A natural fiber fabric; and
(b) An extruded resin layer;
the fabric comprising a basis weight of about 50 to 500 g-m$^{-2}$, warp fiber and a fill fiber, the fabric having a count of about 50 to 4 fibers-cm$^{-1}$, each fiber having a diameter of 30 to 500 denier, the article comprising an add on amount of polymer to fabric of about 0.01 to about 1 g-cm$^{-2}$, a polymer thickness of less than 2 mm, a fiber tensile modulus about 2 to 10 g-denier$^{-1}$, an extensibility of less than 10% in either length or width;
wherein the article comprises a width having a first edge and a second edge, the edge width comprising about 0.1 to 3 centimeters, wherein the hollow article comprises a closed volume surrounded by the flexible article joined at a joint comprising the first edge in contact with the second edge wherein the enclosed volume has a cross-sectional area of about 0.1 to about 10 cm$^2$. The article has enclosed volume and has a cross-sectional area of about 0.5 to about 5 cm$^2$. The article basis weight of the fabric is about 100 to 400 grams-meter$^{-2}$. A hollow article is formed from a planar article, the article having an indeterminate length, a width of about 0.1 to 10 cm and a thickness of about 0.2 to 5 mm, the article consisting essentially of:
(a) A natural fiber fabric;
(b) An extruded resin layer; and
(c) a glass fiber reinforcement fiber, tow or tape;
the fabric comprising a basis weight of about 50 to 500 g-m$^{-2}$, warp fiber and a fill fiber, the fabric having a count of about 50 to 4 fibers-cm$^{-1}$, each fiber having a diameter of 30 to 500 denier, the article comprising an add on amount of polymer to fabric of about 0.01 to about 1 g-cm$^{-2}$, a polymer thickness of less than 2 mm, a fiber tensile modulus about 2 to 10 g-denier$^{-1}$, an extensibility of less than 10% in either length or width;
wherein the article comprises a width having a first edge and a second edge, the edge width comprising about 0.1 to 3 centimeters, wherein the hollow article comprises a closed volume surrounded by the flexible article joined at a joint comprising the first edge in contact with the second edge wherein the enclosed volume has a cross-sectional area of about 0.1 to about 7 cm$^2$. The article has an enclosed volume has a cross-sectional area of about 0.5 to about 5 cm$^2$. The article basis weight of the fabric is about 100 to 400 grams-meter$^{-2}$, the fabric comprises a warp and a weft, the warp and weft comprising a yarn wherein the yarn has a denier of about 40-400, and the yarn has a count in the warp and weft is about 23-4 yarns-cm$^{-1}$. A thermoplastic extrusion formed composite structural member comprising:
(a) at least a first web made from a first material and a first resin; and
(b) at least a second web made from a second material different from the first material;
(c) the first web being wrapped around and joined to a portion of the second web;
(d) wherein the first material is a biologically derived material.

The thermoplastic extrusion formed composite structural member is a plant based material. The thermoplastic extrusion formed composite structural member first material is a cotton fabric. The thermoplastic extrusion formed composite structural member resin is a thermoplastic resin. The thermoplastic extrusion formed composite structural member is a spacer for a double pane window. The thermoplastic extrusion formed composite structural member has a first lateral edge folded to form a first side edge and has a second lateral edge folded for form a second side edge. A thermoplastic extrusion formed composite structural member of claim 16, further comprising:
(a) a third web made from a third material and a third resin; and
(b) a fourth web made from a fourth material;
(c) the first web being wrapped around and joined to a portion of the fourth web;
(d) the third web being wrapped around and joined to a portion of the second web and a portion of the fourth web.

The thermoplastic extrusion formed composite structural member first and third materials are plant based materials. The thermoplastic extrusion formed composite structural member first and third materials are a cotton fabric. The thermoplastic extrusion formed composite structural member resin is a thermoplastic resin. The thermoplastic extrusion formed composite structural member is a spacer for a double pane window. In the thermoplastic extrusion formed composite structural member each of the first and third webs has a first lateral edge folded to form a first side edge and has a second lateral edge folded for form a second side edge. The thermoplastic extrusion formed composite structural member second material is a metal material. The thermoplastic extrusion formed composite structural member of claim 23, wherein the second material and the fourth material are each a metal material. A thermoplastic extrusion formed composite structural member comprising:
(a) at least a first web made from a first material and a first resin; and
(b) at least a second web made from a second material different from the first material;
(c) the first web being wrapped around and joined to a portion of the second web;
(d) wherein the first material is a different material from the second material. The thermoplastic extrusion formed composite structural member first material is a metal material and the second material is a fabric material. The thermoplastic extrusion formed composite structural member first material is a metal material and the second material is fiberglass. The thermoplastic extrusion formed composite structural member first material is a metal material and the second material is a biologically derived material. The thermoplastic extrusion formed composite structural member at least one of the first and second materials is a resin impregnated biologically derived fabric.

The thermoplastic extrusion formed composite structural member is a component configured for use in a building and construction application such as a siding, a trim piece, facia or soffit. A siding article formed from a planar extruded article having an indeterminate length, a width of about 10 cm to 1 m and a thickness of about 0.2 to 5 mm, the article consisting of:
(a) a natural fiber fabric; and
(b) an extruded resin layer;
wherein the fabric comprising a basis weight of about 50 to 500 g·m$^{-2}$, warp fiber and a fill fiber, the fabric having a count of about 50 to 4 fibers·cm$^{-1}$, each fiber having a diameter of 30 to 500 denier, the article comprising an add on amount of polymer to fabric of about 0.01 to about 1 g·cm$^{-2}$, a polymer thickness of less than 2 mm, a fiber tensile modulus about 2 to 10 g·denier$^{-1}$, an extensibility of less than 10% in either length or width and has a shrinkage less than 0.4%. The article basis weight of the fabric is about 100 to 400 grams·meter$^{-2}$. The siding has a longitudinal shrinkage of less than 0.2%.

The above described process allows for the formation of low cost structural members that can be used in a wide variety of applications, such as for building and construction applications, for example exterior siding and window components. Where the webs are formed from a biodegradable and/or recycled component, the resulting structural member will have improved environmental characteristics while at the same time minimizing costs and increasing insulating and strength characteristics. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

I claim:

1. A hollow weather-strip article formed from a planar extruded article having an indeterminate length, a width of about 0.1 to 10 cm and a thickness of about 0.2 to 5 mm, the article consisting of:
(a) a natural fiber fabric; and
(b) an extruded resin layer;
wherein the fabric comprising a basis weight of about 50 to 500 g·m$^{-2}$, warp fiber and a fill fiber, the fabric having a count of about 50 to 4 fibers·cm$^{-1}$, each fiber having a diameter of 30 to 500 denier, the article comprising an add on amount of polymer to fabric of about 0.01 to about 1 g·cm$^{-2}$, a polymer thickness of less than 2 mm, a fiber tensile modulus about 2 to 10 g·denier$^{-1}$, an extensibility of less than 10% in either length or width;
wherein the article comprises a width having a first edge and a second edge, the edge width comprising about 0.1 to 3 centimeters, wherein the hollow article comprises a closed volume surrounded by the flexible article joined at a joint comprising the first edge in contact with the second edge wherein the enclosed volume has a cross-sectional area of about 0.1 to about 7 cm$^2$ and the weather strip article has a shrinkage less than 0.4%.

2. The article of claim 1 wherein the enclosed volume has a cross-sectional area of about 0.5 to about 5 cm$^2$.

3. The article of claim 1 wherein the basis weight of the fabric is about 100 to 400 grams-meter$^{-2}$.

4. A window or door compromising a frame with the weather-strip of claim 1.

5. The article of claim 1 wherein the weather-strip has a longitudinal shrinkage of less than 0.2%.

* * * * *